United States Patent [19]

Thelen et al.

[11] Patent Number: 5,201,264
[45] Date of Patent: Apr. 13, 1993

[54] COOKING VESSEL

[75] Inventors: Arnold Thelen, Idar-Oberstein; Thomas Gerlach, Egenhausen, both of Fed. Rep. of Germany

[73] Assignee: Fissler GmbH, Idar-Oberstein, Fed. Rep. of Germany

[21] Appl. No.: 721,601
[22] PCT Filed: Feb. 3, 1990
[86] PCT No.: PCT/EP90/00187
 § 371 Date: Jul. 19, 1991
 § 102(e) Date: Jul. 19, 1991
[87] PCT Pub. No.: WO90/09133
 PCT Pub. Date: Aug. 23, 1990

[30] Foreign Application Priority Data
 Feb. 18, 1989 [DE] Fed. Rep. of Germany ....... 3905002

[51] Int. Cl.$^5$ .................. A47J 27/00; A47J 27/04; A47J 36/06; A47J 36/12
[52] U.S. Cl. .................. 99/403; 99/413; 126/369; 210/245; 210/246; 220/428; 220/912
[58] Field of Search .......... 99/403, 410, 413, 340, 99/417, DIG. 15, 426; 126/369, 390; 210/244, 245, 246; 220/912, 428

[56] References Cited

U.S. PATENT DOCUMENTS

| | | | |
|---|---|---|---|
| 334,716 | 1/1886 | Murphy | 210/246 |
| 1,160,934 | 11/1915 | Meyer | 210/245 |
| 1,260,794 | 3/1918 | Paquette | 210/245 |
| 1,354,085 | 9/1920 | Zisk . | |
| 1,944,576 | 3/1935 | Dean . | |
| 2,247,230 | 6/1941 | Foster | 210/246 |
| 2,622,591 | 12/1952 | Bramberry | 126/369 |
| 2,924,369 | 2/1960 | Richter | 99/DIG. 15 |
| 4,373,511 | 2/1983 | Miles et al. | 99/467 |
| 4,401,017 | 8/1983 | Feld | 99/413 |
| 4,558,198 | 12/1985 | Levendusky et al. | 126/390 |
| 4,604,989 | 8/1986 | Kita | 99/413 |
| 4,759,342 | 7/1988 | Lee et al. | 126/390 |

FOREIGN PATENT DOCUMENTS

| | | |
|---|---|---|
| 552908 | 5/1957 | Belgium . |
| 1734787 | 8/1956 | Fed. Rep. of Germany . |
| 1753111 | 7/1971 | Fed. Rep. of Germany . |
| 2001195 | 7/1971 | Fed. Rep. of Germany . |
| 2410165 | 6/1979 | France . |
| 2527918 | 12/1983 | France . |
| 2590468 | 5/1987 | France ................ 99/403 |
| 309501 | 11/1955 | Switzerland . |
| 1482641 | 5/1989 | U.S.S.R. ............... 99/403 |
| 248953 | 3/1926 | United Kingdom ...... 210/245 |
| 1241345 | 8/1971 | United Kingdom . |

Primary Examiner—Timothy F. Simone
Attorney, Agent, or Firm—Wenderoth, Lind & Ponack

[57] ABSTRACT

A cooking vessel includes a vessel body having a spill rim extending outwardly and bent around the vessel body. A vessel handle is attached to a wall of the vessel body. A cover than can be set closingly on the spill rim has at least one cover handle. The vessel body and the cover form a spill and ventilation appliance. To guarantee a defined venting and a simple, more reliable, and also defined pouring with more reliable handling, the wall of the vessel body in at least one peripheral region of its upper rim has a larger slope than in remaining peripheral region of the rim due to shortening the spill rim. A rim of the cover in at least one peripheral segment has at least one arch projecting in a radial direction slope when correspondingly positioning the cover through rotation. The remaining peripheral region of the vessel wall without the larger slope has a circumferential length that is at least as large as the peripheral segment of the cover having the at least one arch.

27 Claims, 7 Drawing Sheets

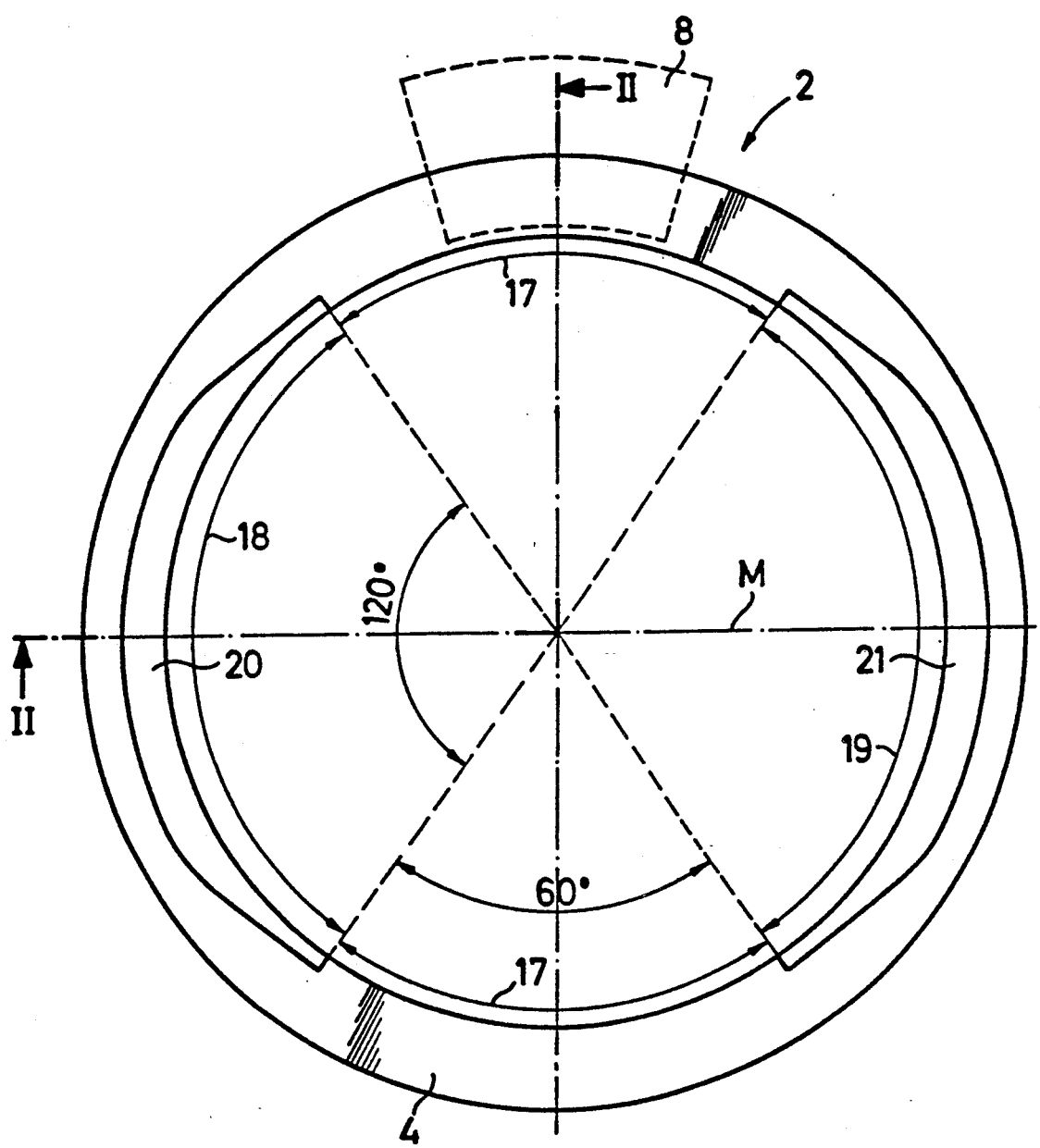
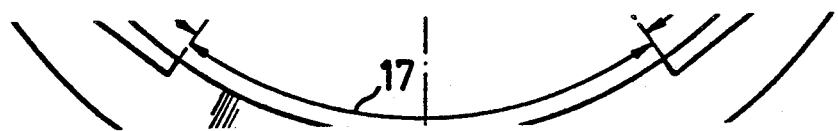
FIG.1

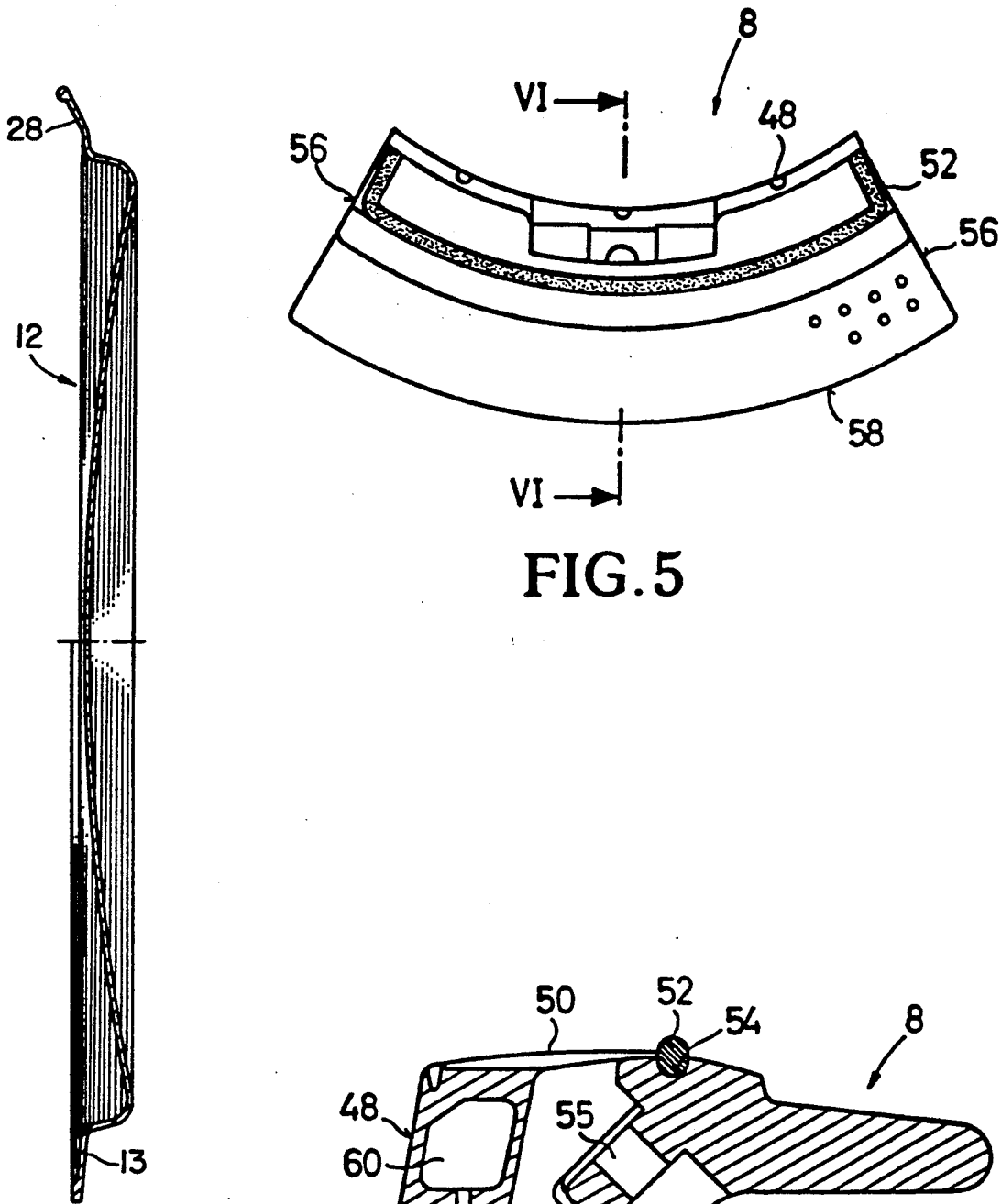

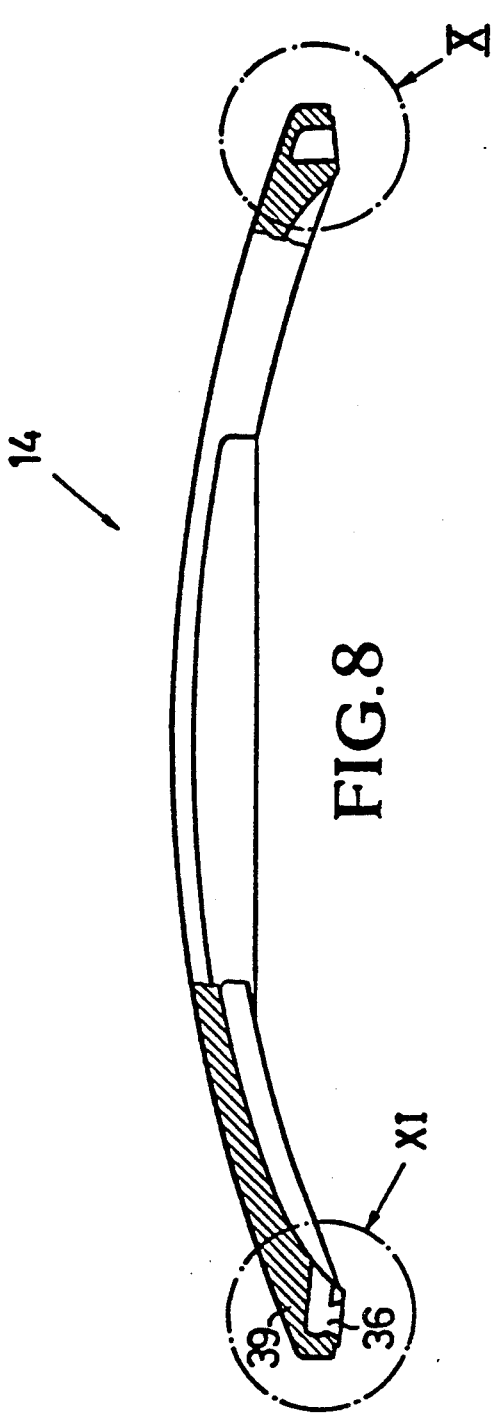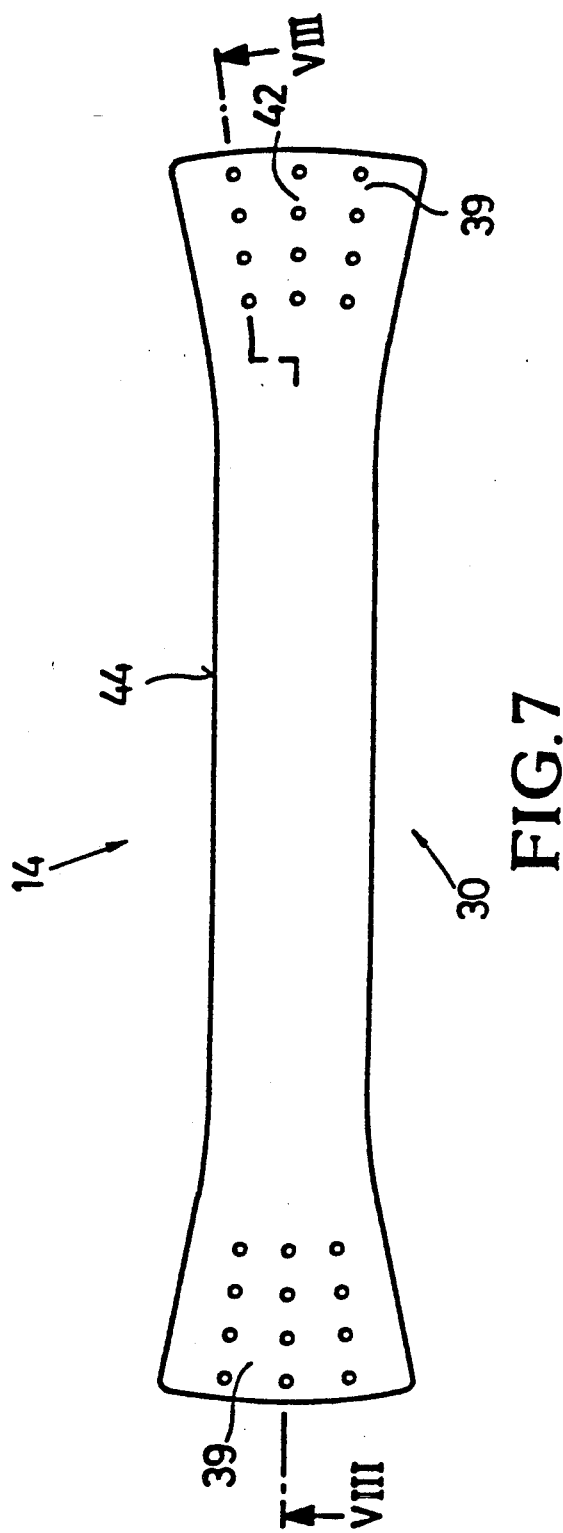

COOKING VESSEL

BACKGROUND OF THE INVENTION

The invention relates to a cooking vessel to receive a product to be cooked and including a vessel body having a substantially planar spill rim extending outwardly and around the vessel body. A vessel handle is attached to the vessel wall and is made of a thermal insulating material such as plastic. A cover has an essentially planar cover rim that can be set closingly on the spill rim and has at least one cover handle. The vessel body and the cover form a spill and/or ventilation appliance.

In known cooking vessels used for boiling or cooking a product to be cooked, ventilation is realized, e.g., by the fact that the cover is not set closingly on the vessel body but rather is arranged only partially on the vessel rim extending around the vessel opening in a undefined tilted position that is selected arbitrarily by the operator. This procedure has the drawback that, depending on the tilt position of the cover on the vessel body, the product to be cooked no longer continues to cook or cooks too much. Thus, the cooking time can increase in an undesired manner or the cooking liquid can boil over due to high temperature and can escape from the cooking vessel.

Following the cooking process, the remaining cooking liquid is frequently supposed to be poured out of the cooking vessel, e.g., after potatoes or vegetables have been cooked. To this end, the cover is displaced or tilted relative to the rim of the vessel opening by the user in such a manner that a spill opening is formed. Of course, it often happens that the spill opening is selected such that, when spilling liquid, the product also falls out of the cooking vessel or that the cooking liquid flows out too slowly. Furthermore, it also can happen that the cover slides completely off the vessel rim, and the entire hot product to be cooked suddenly falls out of the vessel interior. Another drawback of the known cooking vessel is the fact that to spill the cooking liquid the cover must be held tightly at the vessel rim by hand by the user or operator. Since the cooking vessel and cover become generally hot during the cooking process, there is the risk of burning oneself when pouring out the cooking liquid. Even when potholders are used, the pouring must occur very rapidly, since, on the one hand the heat is transferred through the potholders to the hand of the operator, on the other hand steam escapes from the opening region of the cooking vessel.

A device for cooking, serving, and storing food or the like is discussed in DE 33 09 534 A1. Such device comprises a vessel with an open mouth and a cover that can be set removably on the vessel and serves to close the open mouth and that has an opening formed therein. A device is provided to close the opening if the cover assumes a predetermined closing position on the open mouth of the vessel. A central cover handle is designed as one piece with the cover, and vessel handles are located at a significant distance therefrom as broadened segments of a collar extending around the open mouth. Thus, the handles absorb an undesired high temperature when the device is used for cooking. An opening is provided in a collar of the cover in order to be able to accommodate the handle of a kitchen appliance such as a spoon or a kitchen thermometer. The cover can be positioned on the vessel in such a manner that the opening is locked or that, when the cover is put on, a kitchen device can be inserted into the interior of the vessel. Steam also can escape from the interior of the vessel through the opening. The opening is neither defined nor suitable for pouring out cooking liquid.

A cooking pot with a cover is disclosed in DE 1 734 787 U1. The cover has a downwardly directed rim which fits into an upper opening of the pot. In the downwardly directed rim of the cover, there are holes that extend next to one another in a plane and that serve to pour cooking liquid in a controlled manner from the cooking pot. A discharge spout is pressed into the outer rim of the cooking pot so that the cooking liquid to be poured out through the holes can escape to the side without soiling the outer wall of the cooking pot. The cover can be rotated to such an angular position that the holes are closed by the outer pot rim. The cover is provided with a central cover knob and the cooking pot is provided with two opposing ears. In such a design the cover must be held tightly with the hands when the cooking liquid is poured off by tilting the pot, thus incurring the risk of burning oneself. In addition, the gap between the cover rim and the pot rim extends vertically so that the escaping steam directly contacts the hand of the user that reaches over the cover. When the downwardly directed cover rim and/or the upwardly directed pot rim is/are deformed, the cover can be mounted on the pot only with difficulty. If the openings in the cover rim are to have the correct size for a discharge process, the cover rim pointing vertically downward must be wide, a feature that increases the deformability of the cover rim and requirements of the material thereof even more. Furthermore, with this known cooking pot one can see only with difficulty from the top in which angular position the cover is with respect to the pot.

A cooking pot with a cover for household purposes is known from CH 309 501 C1. In such cooking pot gaps are formed between the cover and its contact surface in order to make it possible for steam to escape when cooking and pouring out water or the like with the cover on the pot. The gaps can be formed by pressing in the contact surface for the cover or by pressing in the cover rim itself. In so doing, a complete locking of the cooking pot is not even possible. Even here, when the cooking liquid is poured out, the cover must be held with the thumb of the hand itself.

SUMMARY OF THE INVENTION

The object of the invention is to provide a cooking vessel of the aforementioned type with which not only a defined venting but also a complete closure of the cooking pot is possible during the cooking process, and with which it is possible to pour out cooking liquid in a simple, reliable and also defined manner.

The object is achieved in accordance with the invention in that a vessel wall in at least one peripheral region of its upper rim segment has a larger slope than other peripheral regions thereof by shortening a spill rim thereof, and in that a cover rim in at least one peripheral region thereof has at least one arch projecting in the radial direction into a discharge opening region defined by the larger slope by correspondingly positioning the cover through rotation. The peripheral rim portion of the vessel wall without the larger slope has a circumferential length that is at least as large as the peripheral segment of the cover having the at least one arch. At least one vessel handle is arranged at a position displaced by essentially 90° relative to a radial center line of the peripheral segment of the cover rim having the spill arch. At an open rotational position of the cover relative to the vessel body, the cover handle and the at least one vessel handle are aligned with respect to one another, and at a closed rotational position of the cover relative to the vessel body the cover handle is displaced by an angle of preferably about 90° with respect to the at least one vessel handle.

The invention provides a cooking vessel in which continuous adjustment of a spill and/or ventilation opening can be achieved by simply rotating the cover relative to the vessel body. The desired spill and/or venting opening can be accurately defined in size and can be set a user correspondingly depending on the product to be cooked and cooking liquid. The result of the larger slope and the arch is a region with a defined spill opening, where a defined pouring or spilling of the cooking liquid is achieved. Defined channels, which are blocked by the solid product to be cooked when spilling the cooking liquid and, whereby the other product to be cooked is held back, are formed by the arches. Cooking liquid can be poured off in a simple manner without the risk that the operator will be scalded when spilling the cooking liquid. Owing to the elongated design of the cover handle and longitudinal dimension thereof being displaced by an angle of preferably approximately 90° relative to the center line of the arch, any arbitrary ventilation position and spilling position as well can be adjusted without more effort and immediately can be recognized by the user. Due to the fat that in the open rotational position of the cover relative to the vessel body, the cover handle and the at least one vessel handle are aligned, the cover and the vessel body can be handled together simply without the risk of burning oneself. Due to the displaced position of vessel handles and the cover handle, the closed position of the cover can be clearly recognized by the user, a feature that increases reliability even more.

In an advantageous embodiment of the invention, the peripheral region of the vessel wall equipped with the larger slope has a greater circumferential length than the peripheral segment of the cover that has the at least one arch. In so doing, it has turned out to be especially beneficial that the peripheral region of the vessel wall equipped with the larger slope assumes a circumferential length of about 120°, whereas the peripheral segment of the cover having the at least one arch assumes a circumferential length of about 60°.

An adequately large spill and ventilation opening with cover set in the open rotational position and a simple and defined pouring of the cooking liquid also can be achieved without the cover, in that the larger slope is inclined by an angle ranging from 20° to 40°, preferably by about 30°, relative to the vessel axis.

For handling reasons it has proven to be especially advantageous that the vessel wall in two substantially opposed peripheral regions of its upper rim has a larger slope than in the remaining peripheral regions. Thus, with such a cooking vessel spilling and venting can be accomplished in not only one but rather in two positions. A feature that is important for right and left handed operation, e.g., with a vessel with a single handle.

To vent when spilling the cooking liquid, it is also advantageous if the cover has at least one ventilation opening which is also formed by an arch of the cover rim and which therefore can be manufactured during the manufacturing operation for forming the spill arch.

Preferably the ventilation arch is provided in a peripheral segment of the cover rim opposite the spill arch so that the ventilation opening is not negatively affected by the spilling process.

Preferably the radial dimensions of the spill arch and of the ventilation arch are less than the width of the cover rim in the peripheral region of the vessel wall without the larger slope. In this manner it is guaranteed with simple means that spilling and ventilation functions can take place only in a region in which the peripheral segment of the cover and the peripheral region of the cooking vessel coincide and that in other rotational positions of the cover its complete closing function is guaranteed.

For the above reasons, the radial dimension of the ventilation arch is less than the width of the cover rim. In this manner it is guaranteed that the ventilation arch takes effect only when spilling or in part when venting, since in such case the ventilation arch is arranged above a peripheral region of the vessel wall with the larger slope, whereas in the closed position of the cover complete closure is guaranteed.

Preferably the circumferential length of the ventilation arch is substantially less than that of the peripheral segment having the spill arch, since a small circumferential length of the ventilation arch is adequate for ventilation during spilling. The ventilation function during boiling and cooking is substantially assumed by the peripheral region of the vessel wall and the peripheral segment of the cover rim having the spill arch and the larger slope.

In another especially advantageous embodiment of the invention, the spill arch is subdivided into several, preferably three, bulges. These bulges bring about a type of screening function so that when pouring off the cooking liquid even smaller products to be cooked are retained in the cooking vessel.

A defined spill region of the cooking vessel is achieved in a simple manner in that, when viewed in the direction of the vessel body axis, the peripheral region of the vessel wall that has the larger slope is substantially sickle-shaped.

Furthermore, the invention also related to a cooking vessel, especially of the generic type. By combining at least one vessel handle attached directly below the spill rim and at least one cover handle extending over a substantial part of the diameter of the cover, a system which comprises a vessel and a cover and can be handled more reliably is created with which a user can pour in a simple manner cooking liquid from the cooking vessel without being burned by the cover or scalded by the cooking liquid. By arranging the vessel handle directly below the spill rim and due to the significant length of the cover handle, the distance between vessel handle and cover handle is so small that, when grasping a vessel handle, the user can simply push with the thumb of the hand on the handle of the cover and can hold it tightly without having to touch the cover surface. Even when using only one vessel handle, e.g., in the form of an elongated handle, the cover can be help simply and reliably on the cooking vessel with only one hand.

The cover handle is designed in an advantageous manner as a preferably slightly arched bracket with, apart from its attachment end, a space extending from the upper side of the cover. The slight arch is designed in such a manner that it is impossible for the user to reach under the bracket and burn himself or herself on the hot cover surface. On the other hand, the bracket ensures an adequate space so that the handle retains a lower temperature than the cover.

In an especially simple and advantageous design it is provided that the cover handle is attached to the cover with a plug-snap connection. The plug-snap connection is formed in a simple manner by means of a spring element designed as a spring clip and by means of recesses provided in the attachment ends and by at least one locking projection. Such a spring clip offers the advantage of compensating for manufacturing induced tolerances and heat expansion of the cover handle. The spring element can be riveted or welded in a simple manner on the cover. Spot welding represents the simplest and fastest possibility of attachment and renders the handle attachment invisible even from the cover interior. In the region of the plug-snap connection additional recesses are arranged in an advantageous manner in the attachment ends of the cover handle. These recesses serve to cool the attachment ends of the cover handle, since direct heat transfer between pot cover and cover handle is possible only at the attachment ends.

Another possible embodiment of the invention provides that the cover handle is cemented to the cover.

Since the at least one vessel handle is arranged directly below the bottom edge of the spill rim, it is advantageous for attachment and twist-proof fit that such vessel handle have contact surfaces fitted to the vessel wall and to the bottom edge of the spill rim. Preferably between such contact surfaces and the vessel wall and/or the bottom edge of the spill rim is arranged a seal that prevents the cooking liquid from passing between the bottom edge of the spill rim or vessel wall and the vessel handle and settling there when the product to be cooked boils over. In addition, it is advantageous that the seal is fitted into a groove of the vessel handle.

In another especially advantageous design of the invention it is provided that the vessel handle is screwed to the vessel wall with a single screw extending at an angle of approximately 45° relative to the vessel wall. Owing to this screw attachment, the handle is clamped in a simple manner into the corner formed by the spill rim and the vessel wall. In an advantageous manner the passage of the vessel handle accommodating the single screw is arranged approximately in the center of the vessel handle. Owing to this central screw attachment, the parallelism of handle and pot is guaranteed by a self-centering action, thus guaranteeing an aesthetic appearance of the cooking vessel and vessel handle combination.

An appealing appearance of the cooking vessel also is promoted by the fact that the outer peripheral rim of the preferably totally flat vessel handle extends substantially parallel to the vessel wall, and circumferentially spaced outer side edges of the vessel handle extend substantially radially.

A good grip of the handles is achieved in a simple manner by the fact that the cover handle is contoured in any event in the region of its attachment ends thereof and that at least one vessel handle is contoured at least on its surface. To this end, another advantageous embodiment of the invention provides that the surface contours are designed as ribs, corrugations, knobs, depressions or the like.

Owing to a lateral grasping depression in the handle region of the cover handle, it is very easy for an operator to reach partially under the cover handle without making contact with the hot cover surface. Due to such grasping depression, the cover handle is broadened in the direction of its attachment ends thereof, a feature that produces a positive appearance and offers wide gripping surfaces for the thumbs of a user to rest on when simultaneously grasping the vessel body and cover.

BRIEF DESCRIPTION OF THE DRAWINGS

Other objects, features, advantages and possible applications of the present invention will be apparent from the following description of embodiments thereof with reference to the accompanying drawings. Thus, all described and/or figuratively illustrated features form in themselves or in any arbitrary logical combination the subject of the present invention, independently of the scope of the claims.

FIG. 1 is a top view of a cooking vessel according to the invention.

FIG. 4 is a sectional view of the cover without a cover handle and taken along the line IV—IV of FIG. 3.

FIG. 5 is a top view of a vessel handle.

FIG. 6 is a sectional view of the vessel handle, taken along line VI—VI of FIG. 5.

FIG. 7 is a top view of a cover handle.

FIG. 8 is a fragmented, sectional side view of the cover handle, taken along line VIII—VIII of FIG. 7.

DETAILED DESCRIPTION OF THE INVENTION

Figure 2:
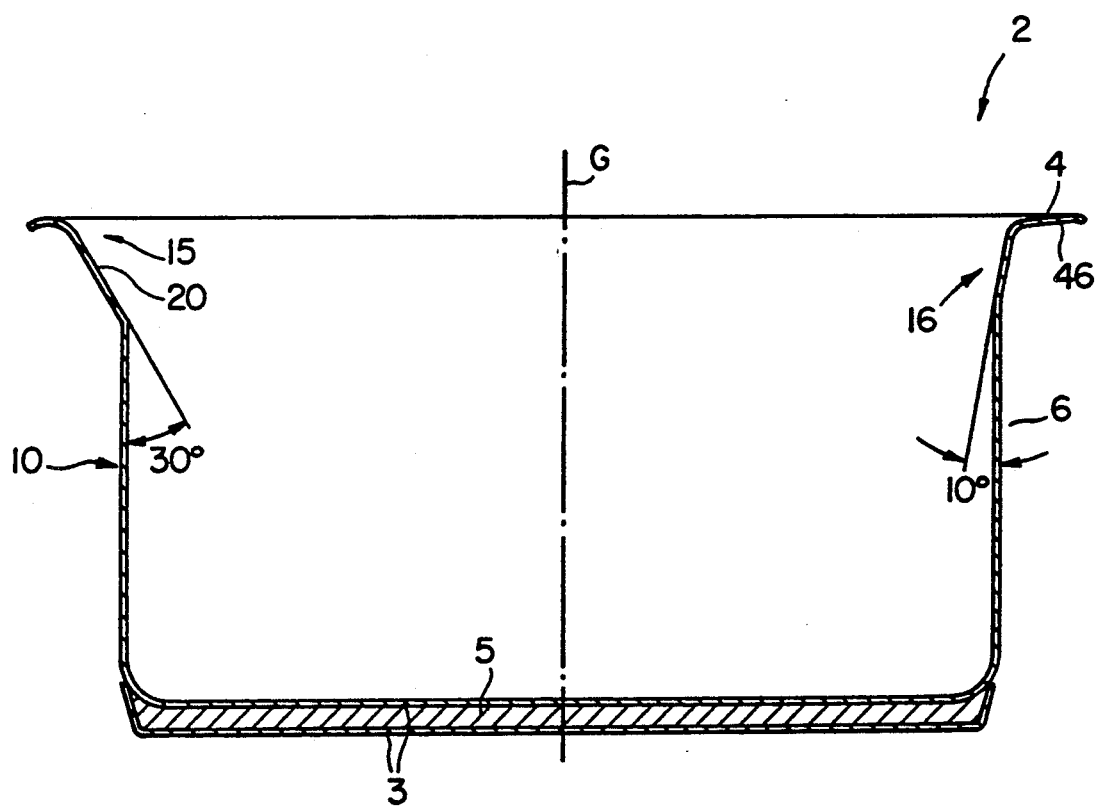
FIG. 2 is a sectional view along line II—II of FIG. 1, but without vessel handles shown in FIG. 1.

The illustrated cooking vessel 2 according to the invention includes a vessel body 10 with a substantially planar spill rim 4 extending outwardly and bent down around the vessel body. At least one vessel handle 8 (shown at the top of FIG. 1 by dashed lines) made of plastic is attached to vessel wall 6 of cooking vessel 2. Preferably provided are two vessel handles 8 designed, e.g., as ears and attached externally to vessel wall 6 on opposite sides thereof or just one single vessel handle 8, e.g. in the form of a stem. Furthermore, cooking vessel 2 has a capsule bottom 3 with a bottom plate 5 made of a highly heat conductive material such as aluminum.

Vessel wall 6 has two opposite peripheral regions 18, 19 adjacent its upper rim or portion that have increased or larger slopes 20, 21. Spill rim 4 in these peripheral regions 18, 19 is shortened in radial dimension from the inside. It is self evident that the invention is not limited to two peripheral regions 18, 19, but rather can also exhibit only one or also several peripheral regions. The shortening of the spill rim 4 in the peripheral regions 18, 19 does not change anything at the circular periphery or the circular shape of vessel body 10 and spill rim 4. In this embodiment, increased slopes 20, 21 are inclined by about 30° relative to the vessel axis G, whereas the upper rim region 16 of vessel wall 6 in the remaining peripheral regions 17 exhibits a slope of only 10°. However, the slopes are not limited to such specific values of 10° or 20°. A form of chute, which opens into a discharge opening region and makes a directed pouring possible, is formed by each of the larger slopes 20, 21.

In the illustrated case, peripheral regions 18, 19 each have a circumferential extent or length of about 120°. Thus, the peripheral regions 17 lying between the peripheral regions 18, 19 each have a peripheral length of about 60°. Here, too, the design of the peripheral regions 18, 19 is not limited to the values indicated. It is quite possible to reduce or increase the respective angles or angular values. As is apparent from FIG. 1, the peripheral regions 18, 19 with the larger slopes 20, 21 have a substantially sickle-shaped form, as seen in the direction of vessel axis G.

Figure 3:
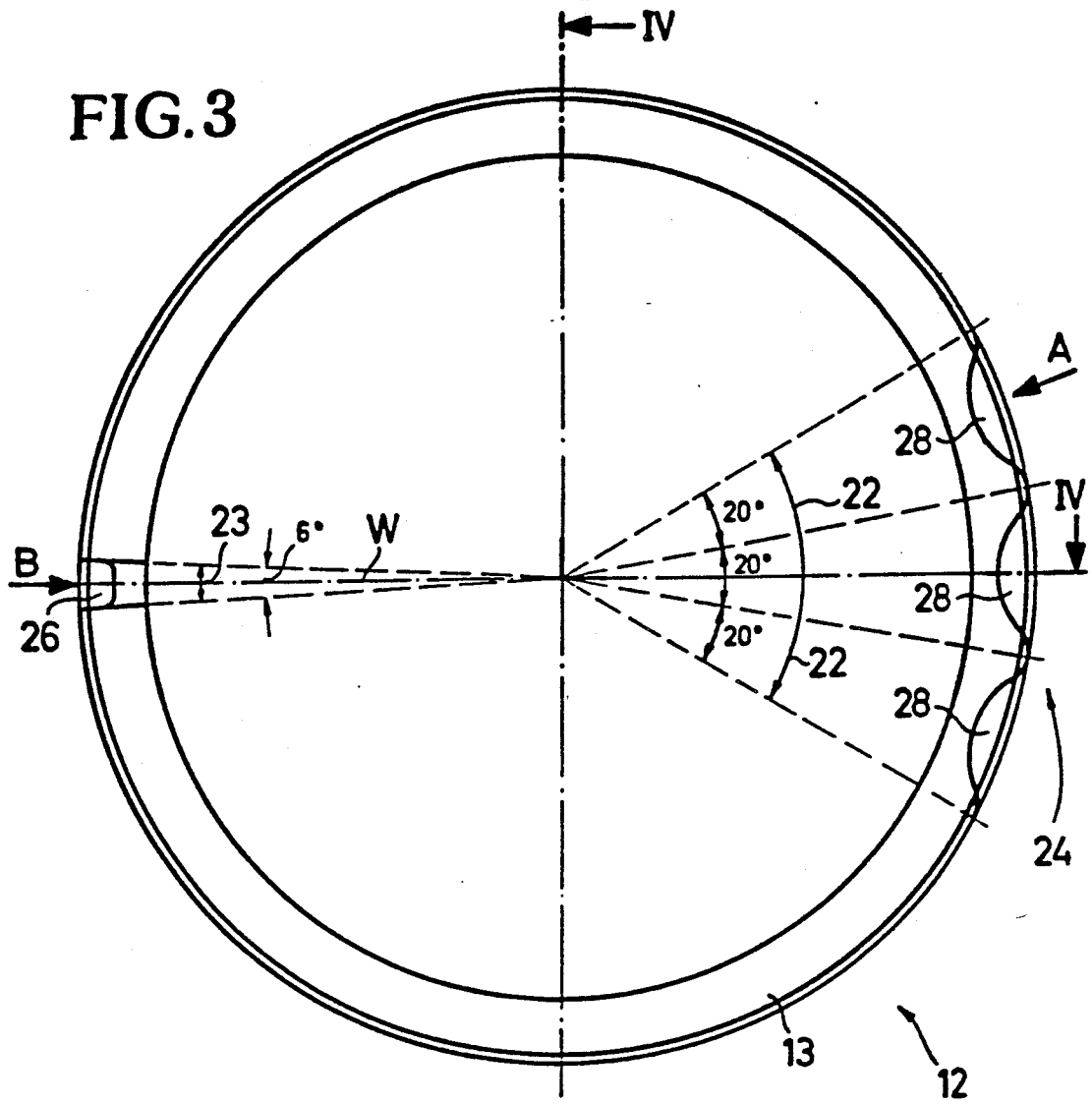
FIG. 3 is a top view of a cover according to the invention.
Figure 3A:
FIG. 3a is an enlarged view of part of a bulge shown in FIG. 3, as seen in the direction of arrow A therein.

A cover 12 has a downwardly bent, substantially planar cover rim 13 and a cover handle 14. In a peripheral segment 22, cover 12 has a spill arch 24 having a radial dimension less than the radial dimension or width of the cover rim 13. The peripheral segment 22 of cover 12 assumes a circumferential or peripheral length of about 60°. In this embodiment the spill arch 24 is subdivided into three channel-shaped bulges 28, each of which in turn has a circumferential or peripheral length of about 20°. FIG. 3a is an enlarged view of such a bulge 28. Inwardly of cover rim 13, the rim area of 12 has a downwardly bent rim crimp extending around rim 13, and the center of the cover 12 is arched slightly outwardly (FIG. 4).

Figure 3B:
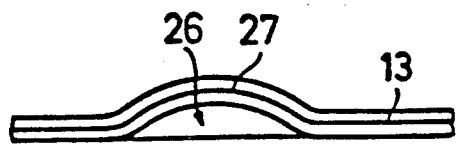
FIG. 3b is an enlarged view of a ventilation arch as seen in the direction of arrow B in FIG. 3.
Figure 9:
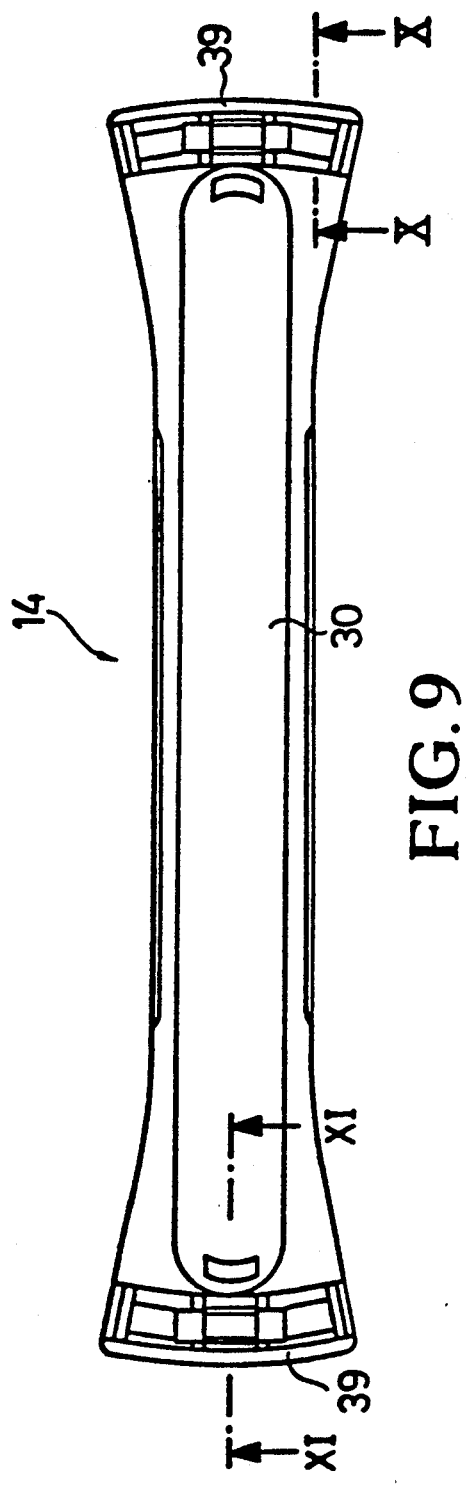
FIG. 9 is a view of the bottom of the cover handle shown in FIGS. 7 and 8.

Furthermore, cover rim 13 has an arch 27 which defines a ventilation opening 26 in an open rotational position of cover 12 and which is located in a peripheral segment 23 of the cover rim 13 opposite the peripheral segment 22 having the spill arch 24. Ventilation arch 27, shown on an enlarged scale in FIG. 3b, has a substantially smaller circumferential dimension than the peripheral segment 22 of cover 12, in particular only about 6°. Like the radial extent of the spill arch 24, the radial extent of ventilation arch 27 is less than the radial width of cover rim 13. With exception of spill arch 24 and ventilation arch 27, cover rim 13 rests loosely but closingly on spill rim 4 of body 10.

When peripheral segment 22 of cover 12 coincides with a peripheral segment 18 or 19, spill arch 24 and ventilation arch 27 project into the regions of the larger slope 20, 21. In this manner when cooking or pouring after cooking, venting can be carried out when the peripheral regions 18 or 19 and the peripheral segment 22 are brought into coincidence. To close the cooking vessel with cover 12 without allowing ventilation, the remaining peripheral regions 17 of the vessel wall 6 not having larger slope 20, 21 include at least one circumferential length that is as large as the peripheral segment 22 of cover 12 having the spill arch 24. If cover 12 is rotated in such a manner that the peripheral segment 22 having the spill arch 24 coincides with a peripheral segment 17 without larger slope 20, 21, the cooking vessel 2 is closed.

The vessel handle 8 or the two vessel handles 8 is/are displaced around the vessel wall by about 90° relative to a center line M of the peripheral regions 18, 19 or the vessel wall 6 having the larger slope 20, 21. Cover handle 14 is elongated. The longitudinal dimension of cover handle 14 extends by about 90° relative to a center line W of peripheral segment 22, as shown in FIG. 3. Thus, in an open rotational position of cover 12 relative to vessel body 10, the cover handle 14 of the vessel handle 8 are aligned. In a closed rotational position of cover 12 relative to vessel body 10, the cover handle 14 is displaced by about 90° relative to the vessel handle 8 or the vessel handles 8.

Cover handle 14 is designed as a slightly arched bracket, which extends, except for attachment ends 39 thereof, over the entire diameter of cover 12 at a distance spaced from the upper surface of cover 12. Cover handle 14 is connected to cover rim 13 of cover 12 by means of the attachment ends 39. Cover handle 14 has on each of opposite sides thereof a grasping recess or depression 44 in a handle segment 30 thereof, whereas in the directions of its attachment ends 39 handle 14 broadens to form thumb rests. Due to the arched shape of cover handle 14 in connection with the outwardly arched cover surface, the space existing between cover 12 and cover handle 14 is insufficient to enable the fingers of a user to be inserted therein. Thus, the risk of the fingers being burned is reduced.

Figure 11A:
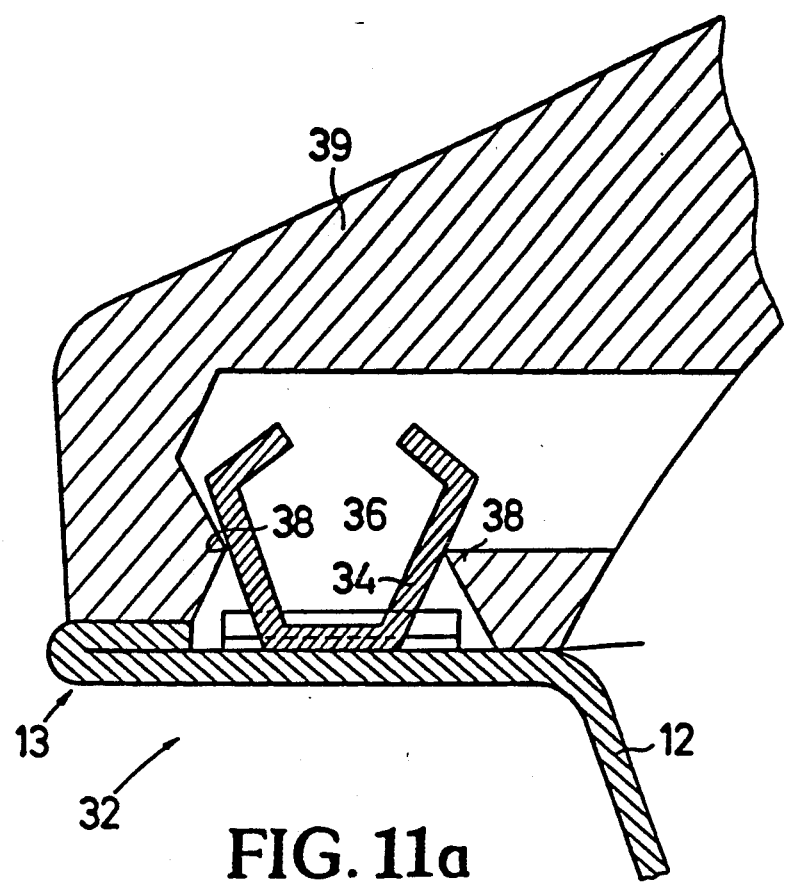
FIG. 11a is an enlarged sectional view of detail XI of FIG. 8 and taken along line XI—XI of FIG. 9 of a plug-snap connection of the cover handle at a rim of the cover.
Figure 11B:
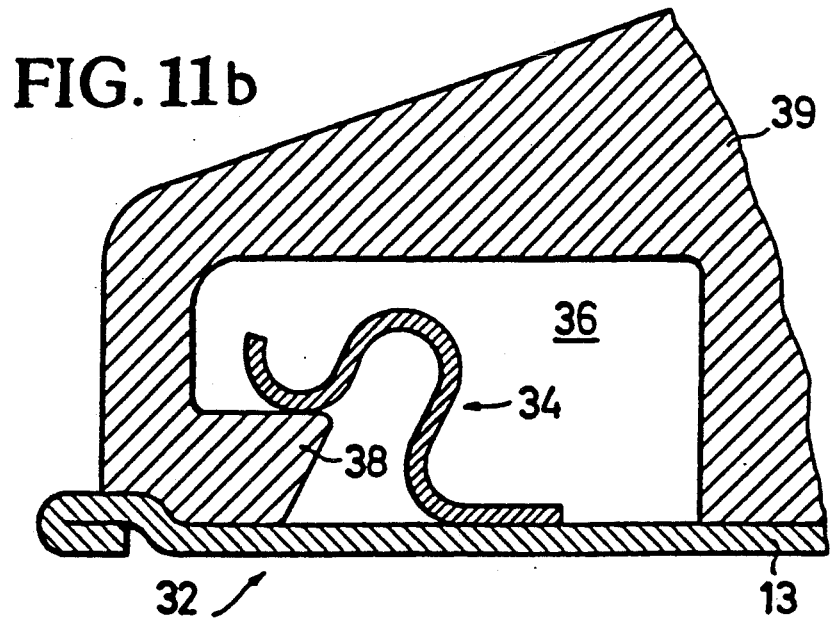
FIG. 11b is a view similar to FIG. 11a but of another plug-snap connection.

There exist different possibilities for attaching the cover handle 14 to cover 12. In addition to cementing cover handle 14 to cover 12, where a stainless steel plate can be inserted optionally into the attachment ends 39, according to FIGS. 11a and 11b, an invisible plug-snap connection 32 is also possible. To this end, cover handle 14 according to FIG. 11a has at its two ends 39 recesses 36 which are defined by locking edges or projections 38. A spring element 34, which in the embodiment of FIG. 11a is designed as a two sided spring clip, is mounted on cover rim 13. The spring clip extends beyond or behind the locking projections 38 and thus causes cover handle 14 to be clamped to cover 12. Cover rim 13 is flanged upwardly for reinforcement, a feature which simultaneously produces an aesthetically appealing appearance. This raising of the outer cover rim region produced by flanging is compensated for by a suitable recess at the attachment ends 39 of cover handle 14. In the embodiment of FIG. 11b, a spring element 34 designed as a curved spring clip extends over a single outer locking projection 38.

Figure 10:
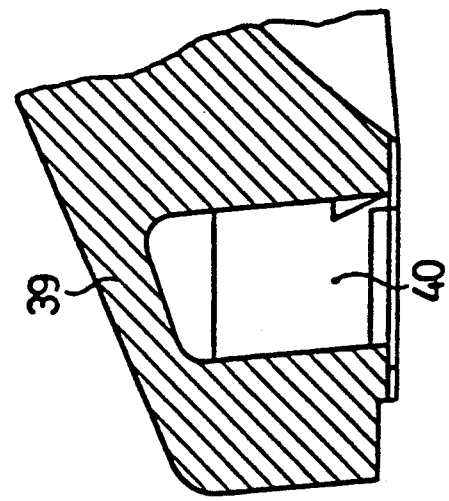
FIG. 10 is an enlarged, sectional view of an attachment end of the cover handle, taken along the line of X—X of FIG. 9 and shown as detail X of FIG. 8.

In the region of the plug-snap connection 32, side recesses 40 are also provided in the attachment ends 39 of cover handle 14 (see FIG. 10). Recesses 40 serve to reduce heat transfer so that the cover handle 14 will be less hot starting from the ends.

The vessel handle 8 shown in FIGS. 5 and 6 is connected directly below the spill rim 4 to the vessel wall 6 of cooking vessel 2. Vessel handle 8 has contact surfaces 48, 50 respectively adapted to vessel wall 6 and the bottom edge 46 of spill rim 4. At least one seal 52 is arranged between contact surfaces 48, 50 and the vessel wall 6 and/or the bottom edge 46 of spill rim 4. Seal 52 is fitted into a groove 54 of vessel handle 8. Approximately in the center of vessel handle 8 is a passage 55 in which a single fastening screw (not illustrated) can be received. Vessel handle 8 is attached to the vessel wall 6 by such fastening screw that extends at an angle of about 45° relative to the vessel wall 6. To reduce the heat transfer and to cool the vessel handle 8, several chambers 60 are provided in vessel handle 8. To prevent liquid which can seep into chamber 60, e.g. when cleaning, from collecting in chambers 60, discharge holes are provided.

A curved outer peripheral rim 58 of the vessel handle 8 designed with a large flat surface as viewed from the top extends approximately parallel relative to the vessel wall 6, whereas opposite circumferential outer end edges 56 of vessel handle 8 extend approximately radially. Thus, a more reliable grasping surface is provided.

Vessel 8 and cover handle 14 have at surfaces thereof surface contours 42 for grasping reliability. These surface contours 42, which at the cover handle 14 are present preferably in the region of its attachment ends 39, are shown in this embodiment as knobs. However, they can also have the shape of ribs, corrugations, depressions or the like.

Both vessel 8 and cover handle 14 are made of plastic or another material having low heat conductivity.

We claim:

1. A cooking vessel for receiving product to be cooked and enabling controlled spilling of cooking liquid and ventilation during cooking and spilling, said cooking vessel comprising:
    a vessel body including a vessel wall defining an axis of said vessel body and a substantially planar spill rim extending outwardly from and circumferentially around an upper axial end of said vessel wall, said vessel wall including an upper rim segment joined to said spill rim and including at least one peripheral region that is sloped and inclined relative to said axis at a greater angle than a remaining peripheral region of said upper rim segment, said at least one peripheral region extending to and defining a peripheral portion of said spill rim having a reduced radial dimension and forming an opening region;
    a cover having extending outwardly therefrom and circumferentially therearound a substantially planar cover rim, said cover being positionable to close said vessel body by said cover rim being positioned on said spill rim and said cover being movable about said axis relative to said vessel body to selected rotational positions, said cover rim having at least one peripheral segment defined by at least one spill arch in said cover rim, said spill arch projecting radially and communicating with said opening region when said cover is at an open rotational position relative to said vessel body whereat said at least one peripheral segment of said cover rim is circumferentially aligned with said at least one peripheral region of said vessel body, thereby defining a spill passage, said at least one peripheral segment of said cover rim having a circumferential dimension no greater than a circumferential dimension of said remaining peripheral region of said upper rim segment of said vessel body;
    at least one vessel handle formed of a thermal insulating material and attached to said vessel wall at a position displaced circumferentially by approximately 90° from a radial center line of said at least one peripheral region;
    an elongated cover handle formed of a thermal insulating material and attached to said cover with a longitudinal dimension of said cover handle displaced circumferentially by approximately 90° from a radial centerline of said at least one peripheral segment of said cover rim;
    whereby, at said open rotational position of said cover relative to said vessel body said cover handle is aligned with said at least one vessel handle; and
    whereby, at a closed rotational position of said cover relative to said vessel body, whereat said at least one peripheral segment of said cover rim is circumferentially aligned with said remaining peripheral region of said upper rim segment of said vessel body, said cover handle is displaced circumferentially by approximately 90° from said at least one vessel handle.

2. A vessel as claimed in claim 1, wherein said circumferential dimension of said at least one peripheral region of said upper rim segment of said vessel body is larger than said circumferential dimension of said at least one peripheral segment of said cover rim.

3. A vessel as claimed in claim 2, wherein said circumferential dimension of said at least one peripheral region is approximately 120°, and said circumferential dimension of said at least one peripheral segment is approximately 60°.

4. A vessel as claimed in claim 1, wherein said angle by which said at least one peripheral region is inclined to said axis is 20°–40°.

5. A vessel as claimed in claim 4, wherein said angle is about 30°.

6. A vessel as claimed in claim 1, wherein said upper rim segment of said vessel body as two said peripheral regions that are inclined to said axis by said greater angle.

7. A vessel as claimed in claim 6, wherein said two peripheral regions are located at diametrically opposed positions.

8. A vessel as claimed in claim 1, wherein said cover has formed therein at least one ventilation opening defined by a ventilation arch in said cover rim.

9. A vessel as claimed in claim 8, wherein said ventilation arch is formed in a peripheral segment of said cover rim diametrically opposite said peripheral segment thereof defined by said at least one spill arch.

10. A vessel as claimed in claim 8, wherein radial dimensions of said spill arch and said ventilation arch are less than a radial dimension of said spill rim at said remaining peripheral region of said upper rim segment of said vessel body.

11. A vessel as claimed in claim 8, wherein a circumferential dimension of a peripheral segment of said cover rim defining said ventilation arch is substantially less than said circumferential dimension of said at least one peripheral segment of said cover rim defining said spill arch.

12. A vessel as claimed in claim 1, wherein said spill arch has a radial dimension less than a radical dimension of said spill rim at said remaining peripheral region of said upper rim segment of said vessel body.

13. A vessel as claimed in claim 1, wherein said spill arch is provided in the form of a plurality of bulges.

14. A vessel as claimed in claim 13, comprising three said bulges.

15. A vessel as claimed in claim 1, wherein said at least one peripheral region of said upper rim segment of said vessel bottom has a sickle-shaped configuration when viewed in the direction of said axis.

16. A vessel as claimed in claim 1, wherein said vessel handle is mounted immediately below said spill rim, and said cover handle extends over a substantial portion of a diameter of said cover.

17. A vessel as claimed in claim 1, wherein said cover handle has at opposite longitudinal ends thereof end attachments mounted on said cover.

18. A vessel as claimed in claim 17, wherein a portion of said cover handle between said end attachments is arched and spaced slightly from an upper surface of said cover.

19. A vessel as claimed in claim 17, wherein said end attachments are cemented to said cover.

20. A vessel as claimed in claim 17, wherein each said end attachment has formed therein a recess defined by at least one locking projection, and further comprising, for each said end attachment, a spring member mounted on said cover and snap fitting into said recess of the respective said end attachment, thereby forming plug-snap connections of said end attachments to said cover.

21. A vessel as claimed in claim 17, wherein at least said end attachments of said cover handle are formed with surface contours.

22. A vessel as claimed in claim 17, wherein said opposite ends of said cover handle are widened laterally, and a portion of said cover handle extending between said opposite ends is provided on at least one side thereof with a gripping depression.

23. A vessel as claimed in claim 1, wherein said at least one vessel handle has respective contact surfaces complementary to said vessel wall and to a bottom surface of said spill rim.

24. A vessel as claimed in claim 23, further comprising at least one seal between said contact surfaces and said vessel wall and/or said bottom surface of said spill rim.

25. A vessel as claimed in claim 23, wherein said vessel handle is attached to said vessel wall by a single screw passing approximately centrally through said vessel handle and extending at an angle of approximately 45° to said vessel wall.

26. A vessel as claimed in claim 23, wherein said vessel handle includes an outer peripheral surface extending substantially parallel to said vessel wall and circumferentially spaced side edge surfaces extending substantially radially.

27. A vessel as claimed in claim 23, wherein said vessel handle is formed with surface contours.

* * * * *